(12) United States Patent
Momose et al.

(10) Patent No.: US 11,012,661 B2
(45) Date of Patent: May 18, 2021

(54) DISPLAY DEVICE, DISPLAY METHOD, AND PROGRAM

(71) Applicant: NEC Display Solutions, Ltd., Tokyo (JP)

(72) Inventors: Keisuke Momose, Tokyo (JP); Tooru Kataoka, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 16/611,178

(22) PCT Filed: May 30, 2017

(86) PCT No.: PCT/JP2017/020146
§ 371 (c)(1),
(2) Date: Nov. 5, 2019

(87) PCT Pub. No.: WO2018/220724
PCT Pub. Date: Dec. 6, 2018

(65) Prior Publication Data
US 2020/0195880 A1 Jun. 18, 2020

(51) Int. Cl.
*H04N 7/01* (2006.01)
*G06F 21/10* (2013.01)
(Continued)

(52) U.S. Cl.
CPC ............ *H04N 7/01* (2013.01); *G06F 21/10* (2013.01); *H04L 9/30* (2013.01); *G06F 2221/0753* (2013.01)

(58) Field of Classification Search
CPC ............ H04N 7/01; H04N 21/43632; H04N 21/43635; G06F 21/10; G06F 2221/0751;
(Continued)

(56) References Cited

U.S. PATENT DOCUMENTS 7,287,282 B2 * 10/2007 Yamada ................ G06F 21/445
380/201
7,386,641 B2 * 6/2008 Xu ...................... H04L 12/2812
709/231
(Continued)

FOREIGN PATENT DOCUMENTS

JP 2008-067267 A 3/2008
JP 2012-090227 A 10/2015
(Continued)

OTHER PUBLICATIONS

International Search Report (ISR) (PCT Form PCT/ISA/210), in PCT/JP2017/020146, dated Aug. 15, 2017.

*Primary Examiner* — Brian P Yenke
(74) *Attorney, Agent, or Firm* — McGinn IP Law Group, PLLC

(57) ABSTRACT

A display device includes: a display unit daisy-chain connected to a source device that outputs an image signal encoded with a prescribed version of a standard specified as a prescribed standard, displaying an image generated by decoding the image signal encoded with the prescribed version; a determination unit that determines the number of connected sink devices that are daisy-chain connected to the source device; and a setting unit that sets, from among the prescribed versions, a version in which the image that was generated by decoding the image signal encoded by the source device is displayable on the display units of all of the daisy-chain connected sink devices, depending on the number of connected sink devices.

19 Claims, 6 Drawing Sheets

(51) Int. Cl.
*H04L 9/30* (2006.01)
*H04N 21/436* (2011.01)
*H04N 21/4363* (2011.01)

(58) Field of Classification Search
CPC ........ G06F 2221/0753; G09G 2370/12; G09G 2370/20; G09G 2370/04; H04L 9/30
See application file for complete search history.

(56) References Cited

U.S. PATENT DOCUMENTS

| | | | | |
|---|---|---|---|---|
| 7,489,337 B2* | 2/2009 | Houmeau | H04N 9/12 | 345/1.3 |
| 7,788,727 B2* | 8/2010 | Shintani | H04N 21/4122 | 726/26 |
| 7,940,329 B2* | 5/2011 | Houmeau | H04N 9/12 | 345/1.3 |
| 7,996,869 B2* | 8/2011 | Tu | H04N 5/44543 | 725/152 |
| 8,072,549 B2* | 12/2011 | Inoue | G06F 3/14 | 348/552 |
| 8,411,851 B2* | 4/2013 | Jackson | H04N 21/4367 | 380/2 |
| 8,442,215 B2* | 5/2013 | Jackson | H04N 21/4122 | 380/2 |
| 8,549,198 B2* | 10/2013 | Cohen | G06F 13/4004 | 710/106 |
| 8,692,937 B2* | 4/2014 | Altmann | H04N 9/475 | 345/1.3 |
| 8,838,845 B2* | 9/2014 | Rabii | G09G 5/006 | 710/15 |
| 8,976,961 B2* | 3/2015 | Bohm | H04N 21/4367 | 370/210 |
| 9,009,361 B2* | 4/2015 | Kataoka | H04N 21/43635 | 710/14 |
| 9,032,538 B2* | 5/2015 | Okada | G06F 21/00 | 380/229 |
| 9,237,303 B2* | 1/2016 | Suzuki | H04N 11/08 | |
| 9,554,183 B2* | 1/2017 | Dong | H04N 5/38 | |
| 9,591,257 B2* | 3/2017 | Oh | H04N 7/0117 | |
| 9,628,855 B2* | 4/2017 | Choi | H04N 21/4408 | |
| 9,756,308 B2* | 9/2017 | Takahashi | H04N 11/06 | |
| 9,756,385 B1* | 9/2017 | Oh | H04N 21/4402 | |
| 9,912,903 B2* | 3/2018 | Kozuka | H04N 21/4402 | |
| 9,955,112 B2* | 4/2018 | Jung | H04N 5/38 | |
| 10,091,546 B2* | 10/2018 | Choi | H04N 21/4408 | |
| 10,110,887 B2* | 10/2018 | Mendenhall | G06F 3/0482 | |
| 10,306,179 B2* | 5/2019 | Byun | H04N 21/43635 | |
| 10,306,307 B2* | 5/2019 | Sanders | H04N 21/4402 | |
| 10,319,336 B2* | 6/2019 | Oh | G09G 5/006 | |
| 10,440,289 B2* | 10/2019 | Asai | H04N 7/0117 | |
| 10,509,614 B2* | 12/2019 | Urata | G09G 5/12 | |
| 10,529,299 B2* | 1/2020 | Sakagami | H04N 9/3147 | |
| 10,817,242 B2* | 10/2020 | Momose | H04N 9/3147 | |
| 2006/0012540 A1* | 1/2006 | Logie | G09G 5/12 | 345/10 |
| 2006/0209884 A1* | 9/2006 | MacMullan | H04N 21/43615 | 370/465 |
| 2008/0232209 A1* | 9/2008 | Vergoossen | H04N 21/44209 | 369/47.5 |
| 2008/0291863 A1* | 11/2008 | Agren | H04N 21/43637 | 370/315 |
| 2009/0091656 A1* | 4/2009 | Kitaru | H04N 21/44222 | 348/554 |
| 2009/0174817 A1* | 7/2009 | Sato | H04N 21/43635 | 348/554 |
| 2009/0185682 A1* | 7/2009 | Kellerman | G09G 5/006 | 380/201 |
| 2010/0129062 A1* | 5/2010 | Nakajima | H04N 21/458 | 386/241 |
| 2010/0253856 A1* | 10/2010 | Sato | H04N 5/775 | 348/723 |
| 2010/0275234 A1* | 10/2010 | Kannon | H04N 21/43632 | 725/58 |
| 2011/0150215 A1* | 6/2011 | Domingo | G09G 5/006 | 380/200 |
| 2011/0150216 A1* | 6/2011 | Barry | H04N 21/43632 | 380/201 |
| 2011/0157473 A1* | 6/2011 | Choi | G09G 5/003 | 348/566 |
| 2011/0164118 A1* | 7/2011 | Choi | H04N 13/398 | 348/51 |
| 2011/0283129 A1* | 11/2011 | Guillerm | H04N 21/43635 | 713/324 |
| 2012/0257750 A1* | 10/2012 | Bohm | H04N 21/41422 | 380/212 |
| 2013/0141475 A1* | 6/2013 | Kotani | G09G 5/001 | 345/690 |
| 2013/0181884 A1* | 7/2013 | Perkins | G06F 3/1423 | 345/1.3 |
| 2014/0211941 A1* | 7/2014 | Oh | G09G 5/006 | 380/201 |
| 2014/0218608 A1* | 8/2014 | Stelliga | H04N 21/43635 | 348/441 |
| 2015/0215575 A1* | 7/2015 | Rin | H04N 9/87 | 386/231 |
| 2015/0325201 A1* | 11/2015 | Toba | H04N 5/38 | 345/520 |
| 2016/0094648 A1* | 3/2016 | Han | H04W 12/003 | 709/209 |
| 2016/0179455 A1* | 6/2016 | Liu | G09G 5/12 | 345/2.2 |
| 2018/0165919 A1* | 6/2018 | Arnone | G07F 17/3234 | |
| 2018/0197012 A1* | 7/2018 | Wengrovitz | G08B 13/19613 | |
| 2019/0230406 A1* | 7/2019 | Aggarwal | H04N 5/63 | |
| 2019/0286404 A1* | 9/2019 | Momose | H04N 9/3147 | |
| 2020/0053311 A1* | 2/2020 | Ogiso | H04N 5/44513 | |
| 2020/0077063 A1* | 3/2020 | Yamasaki | H04N 9/3147 | |

FOREIGN PATENT DOCUMENTS

WO WO 2015/153561 A1 10/2015
WO WO 2016/170596 A1 10/2016

* cited by examiner

DISPLAY DEVICE, DISPLAY METHOD, AND PROGRAM

TECHNICAL FIELD

The present invention relates to a display device, a display method, and a program.

BACKGROUND ART

The use of DVI (Digital Visual Interface), which is the interface standard between a personal computer (hereinbelow referred to as a "PC") and a display, enables a digital signal to be sent directly from a PC to a display. Accordingly, an image that is generated based on the digital signal can be shown on the display without causing degradation, and image quality can thus be improved. The use of HDMI (High-Definition Multimedia Interface) (trademark), which is a standard that is a further development of these DVI standard, enables the transmission of a clear video/audio signal (hereinbelow, a "video/audio signal" is referred to as a "content signal") as a digital signal. HDMI can be rated as an important standard that supports HDTV (High-Definition Television).

In fields such as DVDs (Digital Versatile Disks) and digital television broadcasting, a content signal is protected by using encryption technology. Accordingly, even when a content signal is simply extracted to produce a reproduction, the content signal cannot be reproduced. However, when a device such as a PC is used to reproduce a content signal, the code is decoded when being shown on a display and the content signal enters a vulnerable state. At this instant, the concern arises that a reproduction known as a pirated copy will be produced by extracting the content signal from the transmission system between the PC and the display.

When the transmission system between a PC and a display is realized by using an analog signal, only a degraded content signal can be obtained even when a reproduction is produced by extracting the content signal from the transmission system as when using a video deck to dub to a tape. However, when a digital signal that uses the DVI standard is used in the transmission system between a PC and a display, a reproduction that is free of degradation can be produced by extracting the content signal that is transmitted from the PC. In this way, a standard referred to as HDCP (High-bandwidth Digital Content Protection) was decided upon and managed by an organization known as Digital Content Protection, LLC as one copyright protection technology that prevents the illegal production of reproductions and that with the original content signal and image quality.

In HDCP, a content signal is encoded on the path of transmission of a digital signal between a video reproduction apparatus such as a PC and a display apparatus such as a display. More specifically, the apparatus on the transmitting side of the content signal authenticates the apparatus on the receiving side. Then, by using public key cryptography, the key that is used to encode the content signal is shared between the transmitting-side apparatus and receiving-side apparatus. The transmitting-side apparatus uses this public key to encode the content signal and then transmits. In this way, extraction or alteration of the content signal is prevented during transmission. A content signal that is protected by HDCP is not displayed on the receiving-side apparatus when the transmitting-side apparatus and receiving-side apparatus are not both compatible with the HDCP standard. Further, even if a bogus apparatus is used to extract the content signal, authentication to determine whether an apparatus is legitimate is not achieved. As a result, transmission of the content signal to a bogus apparatus from the transmitting-side apparatus is denied.

The HDCP standard is currently being updated to HDCP ver. 2.2 (hereinbelow referred to as "HDCP 2.2") that is necessary in models compatible with 4K television broadcasting. Copyright protection technology is becoming more robust in proportion to the improvement in image quality that comes with 4K television broadcasting. Further, because 4K television broadcasting is currently still at the stage of test broadcasting, mainstream image reproduction apparatuses and image display apparatuses (these apparatuses are hereinbelow collectively referred to as "display devices") that have gone on the market are currently compatible with HDCP ver. 1.4 (hereinbelow referred to as "HDCP 1.4") that is the current HDCP standard and HDCP 2.2 that is a standard in which HDCP 1.4 has been updated.

In addition, display devices that are compatible with the HDCP standard are subject to more severe restrictions regarding the number of display devices that are daisy-chain connected (strung in a row) in order to make the copyright protection technology more robust.

Display devices (hereinbelow referred to as "sink apparatuses") or relay apparatuses (hereinbelow referred to as "repeater apparatuses") that are compatible with the HDCP standard must receive the authentication of the signal source (hereinbelow referred to as "source apparatus") such as a PC. A sink apparatus is an apparatus that displays images on the basis of a content signal, for example, that is copyright protected by the HDCP standard. A repeater apparatus is an apparatus that is arranged between, for example, a source apparatus and a sink apparatus and that distributes a content signal that is copyright protected by the HDCP standard. Finally, a sink apparatus may be provided with the functions of a repeater apparatus. When sink (repeater) apparatuses and source apparatus are connected using a cable that conforms to the HDMI standard and the above-described authentication is performed, the maximum depth and maximum number of devices of the repeater apparatuses that relay the content signal are determined in advance as limitations on the number of devices that are daisy-chain connected. Here, the depth refers to the number of levels in which repeater apparatuses are connected. The number of devices is the number of devices that are connected in all levels.

For example, in the case of HDCP 1.4, the maximum depth of repeater apparatuses is 8, and the maximum device number of sink apparatuses is limited to 128. Further, in the case of HDCP 2.2, the maximum depth of repeater apparatuses is 4, and the maximum device number of sink apparatuses is limited to 32.

LITERATURE OF THE PRIOR ART

Patent Documents

Patent Document 1: WO 2016/170596

SUMMARY OF THE INVENTION

Problem to be Solved by the Invention

A case is here considered in which a content signal is supplied from an image reproduction apparatus that is one example of a source apparatus that is compatible with both the HDCP 2.2 and HDCP 1.4. For example, when the content signal that is supplied from an image reproduction apparatus is encoded using HDCP 2.2, and a projector that is one example of a sink apparatus that is compatible with both HDCP 2.2 and HDCP 1.4 is daisy-chain connected to the image reproduction apparatus, the encoded content signal can be decoded and displayed by setting the projector to HDCP 2.2.

However, when the levels of daisy-chain connection of the projector are 5 or more, the effect of the limitation of the number of levels of HDCP 2.2 comes into play. In other words, a content signal that is encoded using HDCP 2.2 in the image reproduction apparatus cannot be decoded in the projector. As a result, the displayed image of the projector becomes an abnormal display such as total black or a random pattern similar to a sandstorm.

At this time, the HDCP settings of each projector that is daisy-chain connected is changed from HDCP 2.2 to HDCP 1.4, whereby the limitation on the number of levels can be relaxed to a maximum of 8. As a result, the content signal that is encoded by the image reproduction apparatus can be decoded and displayed in the projector.

However, a change of the setting of the HDCP version of this type must be carried out manually step by step by the user. Accordingly, the problem arises that the need for the time and trouble to change the setting of the HDCP version increases with increase of the number of image reproduction apparatuses that are daisy-chain connected in a plurality of levels.

Patent Document 1 discloses a technology by which a display device displays a partitioned image that corresponds to its own device that is a portion of an image that is received when display devices such as projectors or monitors are daisy-chain connected.

However, no disclosure is made in Patent Document 1 regarding changing of the setting of the HDCP version according to the number of levels of display devices that are daisy-chain connected. Accordingly, a change of the settings of the HDCP version is not assumed even when the number of levels that are daisy-chain connected is great. As a result, when there are many display devices that are daisy-chain connected in a plurality of levels, the problem of the time and trouble required for changing the setting of the HDCP version remains unresolved.

It is an object of the present invention to provide a display device, a display method, and a program that, in view of the above-described problem, solves problems by eliminating the time and trouble of changing the setting of the HDCP version that is associated with the number of display devices that are daisy-chain connected even when a plurality of display devices are daisy-chain connected to a source device.

Means for Solving the Problem

The display device of the present invention is provided with: display means that is daisy-chain connected to a source apparatus that supplies a video signal that was encoded by a predetermined version of a standard that is stipulated as a predetermined standard and that displays images that are generated by decoding a video signal that was encoded by the predetermined version; determination means that determines the number of connected sink apparatuses that are daisy-chain connected to the source apparatus; and setting means that, according to the number of the connected sink apparatuses, sets a version of the predetermined versions that is able to display, on the display means of all the sink apparatuses that are daisy-chain connected, images that are generated by decoding a video signal that was encoded at the source apparatus.

In addition, the display method of the present invention is provided with steps of: daisy-chain connecting to a source apparatus that supplies a video signal that was encoded by a predetermined version of a standard that is stipulated as a predetermined standard and displaying images that are generated by decoding a video signal that was encoded by the predetermined version; determining the number of connected sink apparatuses that are daisy-chain connected to the source apparatus; and, according to the number of connected sink apparatuses, setting a version of the predetermined versions that is able to display on the display means of all the sink apparatuses that are daisy-chain connected images that are generated by decoding a video signal that was encoded at the source apparatus.

Further, the program of the present invention causes a computer to execute processes of: daisy-chain connecting to a source apparatus that supplies a video signal that was encoded by a predetermined version of a standard that is stipulated as a predetermined standard and displaying images that are generated by decoding a video signal that was encoded by the predetermined version; determining the number of connected sink apparatuses that are daisy-chain connected to the source apparatus; and, according to the number of the connected sink apparatuses, setting a version of the predetermined versions that is able to display on the display means of all the sink apparatuses that are daisy-chain connected images that are generated by decoding a video signal that was encoded by the source device.

Effect of the Invention

The present invention can provide a display device, a display method, and a program that, even when a plurality of display devices are daisy-chain connected to a source apparatus, can eliminate the time and trouble of changing the setting of the HDCP version is associated with the number of display devices that are daisy-chain connected.

BEST MODE FOR CARRYING OUT THE INVENTION

Overview of First Example Embodiment

Figure 1:
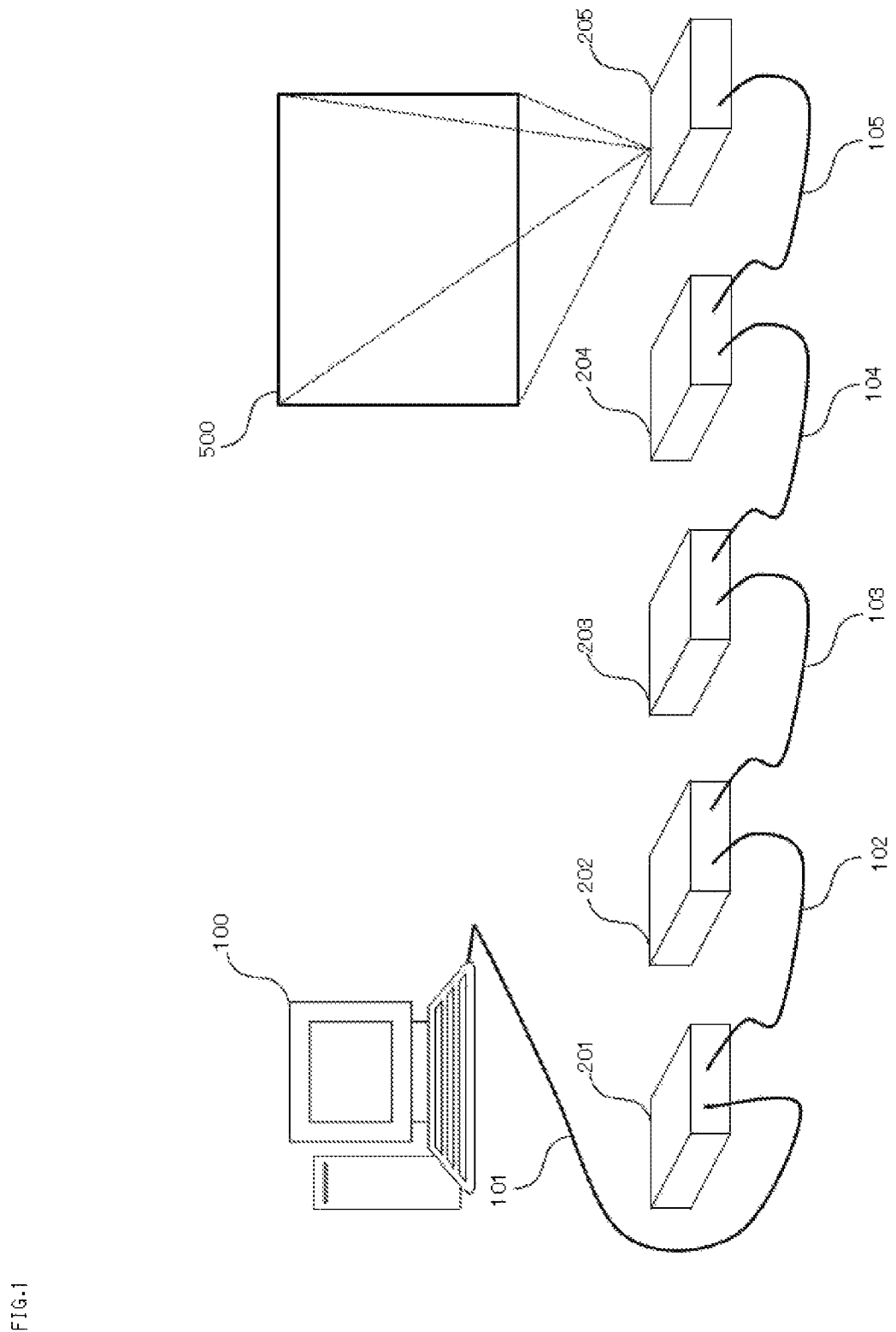
FIG. 1 is a schematic view showing an example of the configuration when projectors that are an example of the display device of the first example embodiment of the present invention are daisy-chain connected.

An overview of the first example embodiment is first described using FIG. 1. FIG. 1 is a schematic view showing an example of the configuration when projectors that are an example of the display device of the first example embodiment of the present invention are daisy-chain connected. In FIG. 1, a video signal that is supplied from PC 100 that is the source apparatus is transmitted to projector 205 by way of five projectors (sink apparatuses) 201, 202, 203, and 204 that are daisy-chain connected in a horizontal direction. The final projector 205 projects upon screen 500 images that are generated on the basis of the transmitted video signal. HDMI cables 101, 102, 103, 104, and 105 are used to connect between PC 100 and projector 201, between projector 201 and projector 202, between projector 202 and projector 203, between projector 203 and projector 204, and between projector 204 and projector 205, respectively. The video signal that is supplied from PC 100 is applied as input to projectors 201, 202, 203, 204, and 205 by way of HDMI cables 101, 102, 103, 104, and 105.

In the present example embodiment, a KSV (Key Selection Vector), which is an HDCP encoding technology used in the communication of digital video signals such as HDMI and DVI, is used when a display system is configured by daisy-chain connecting a plurality of display devices (sink apparatuses).

HDCP uses a protocol called HDCP protocol as the encoding protocol in the transmission of video signals. In addition, KSV is an example of an encoding key that is used in, for example, encoding or decoding a code and is also referred to as a "public key." KSV is a characteristic key that is assigned for each apparatus that is compatible with HDCP.

In HDCP, a sink apparatus and a repeater apparatus must receive the authentication of a source apparatus such as PC 100. A sink apparatus is, for example, an apparatus that displays images on the basis of a video signal that is protected by using HDCP. In addition, a repeater apparatus is, for example, an apparatus that is arranged between a source apparatus and a sink apparatus and that distributes a video signal that is protected by using HDCP. In addition, the functions of a repeater apparatus may also be provided in a sink apparatus.

In the process of receiving authentication of the source apparatus, a sink apparatus and a repeater apparatus use a cable such as an HDMI cable that transmits a digital video signal to connect the sink apparatus (repeater apparatus) and the source apparatus. The sink apparatus (repeater apparatus) then transmits the certificate of its own apparatus or KSV to the source apparatus by way of the cable. The KSV is transmitted to the source apparatus from the sink apparatus (repeater apparatus) that is connected to the source apparatus and from all sink apparatuses (repeater apparatuses) that are connected by way of this sink apparatus (repeater apparatus). The KSV is used as a public key that is used in encoding. As a result, the KSV that is transmitted from the sink apparatuses (repeater apparatuses) is not altered at, for example, other sink apparatuses. The following explanation is presented with focus upon sink apparatuses, but this explanation can similarly apply to repeater apparatuses.

For example, when HDMI cables are used to daisy-chain connect a plurality of sink apparatuses, a KSV that is transmitted from the sink apparatus that is located at the end (for example, projector 205 in FIG. 1) is transmitted to the source apparatus while maintaining the state of the KSV that is transmitted from projector 205 located at the end regardless of the sink apparatuses that are passed on the way to the source apparatus (PC 100). In the following explanation, of the daisy-chain connections from the source apparatus up to the sink apparatus at the end, the source apparatus side is here assumed to be the upstream or higher-ranked side and the side of the sink apparatus at the end is assumed to be the downstream or lower-ranked side.

When a plurality of sink apparatuses are daisy-chain connected, the KSV from each of the sink apparatuses is transmitted to the source apparatus. At this time, each of the sink apparatuses stores the KSV that is received from a lower-ranked sink apparatus in the memory (storage unit) possessed by each sink apparatus. Each of the sink apparatuses then transmits the KSV that was received from the lower-ranked sink apparatus and that was stored in the memory (storage unit) to the higher-ranked sink apparatus or source apparatus. In addition, when the HDMI cable that connects with the lower-ranked sink apparatus is cut, the sink apparatus deletes the KSV of the lower-ranked sink apparatus from the memory (storage unit) of its own device. Here, the severance of the connection of the HDMI cable includes the interruption (OFF) of the power supply of the lower-ranked sink apparatus.

The present example embodiment uses the characteristic that when a plurality of sink apparatuses are daisy-chain connected, the number of KSV that are stored in the memory of sink apparatuses that are located upstream increases in proportion with the number of sink apparatuses that are passed through. Details relating to this point will be described hereinbelow.

First Example Embodiment

As shown in FIG. 1, the display system that uses the display device of the first example embodiment has: PC 100 that is an example of a source apparatus; projectors 201, 202, 203, 204, and 205 (hereinbelow referred to as apparatus 1, apparatus 2, apparatus 3, apparatus 4, and apparatus 5) that are examples of sink apparatuses; HDMI cables 101, 102, 103, 104, and 105 that connect between PC 100 and projector 201, between projector 201 and projector 202, between projector 202 and projector 203, between projector 203 and projector 204, and between projector 204 and projector 205, respectively; and screen 500 that displays the image projected from projector 205.

PC 100 and projectors 201, 202, 203, 204, and 205 are daisy-chain connected using HDMI cables 101, 102, 103, 104, and 105 that are cables for transmitting a video signal. In addition, the cables that transmit the video signal may transmit information other than the video signal. Further, apparatus 1 to apparatus 5 are connected together by way of communication units that transmit and receive information. The communication units are connected to other projectors using, for example, wired LAN (Local Area Network), RS (Recommended Standard) 232C, wireless LAN, and CEC (Consumer Electronics Control). Still further, the communication units may be provided in a portion of the control units that make up the projectors. PC 100 is connected to apparatus 1 201 by way of HDMI cable 101. A cable that conforms with the DVI standard may also be used in place of HDMI cable 101.

Figure 2:
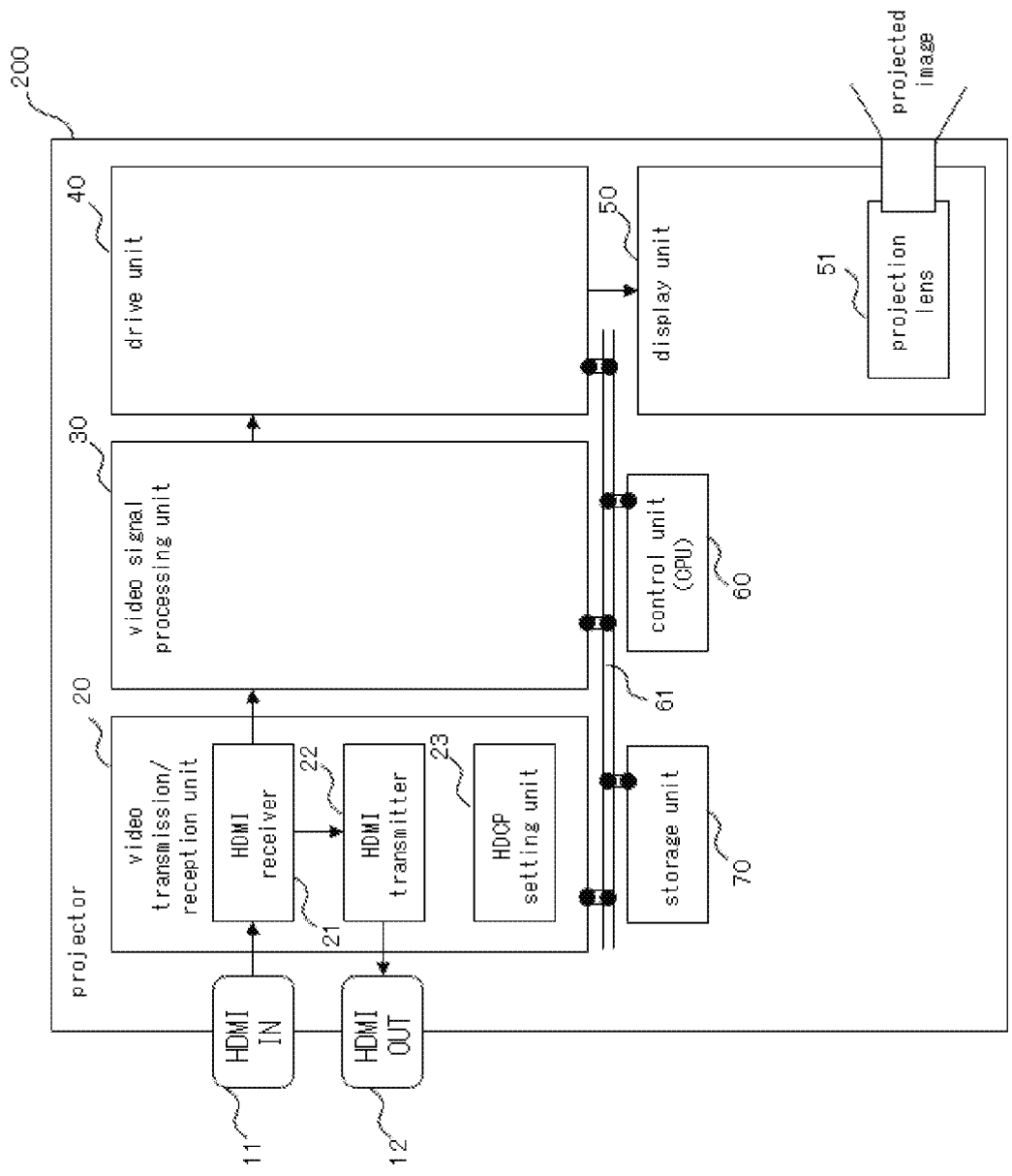
FIG. 2 is a block diagram showing the internal configuration of a projector that is an example of the display device of the first example embodiment.

The internal configuration of a projector that is an example of the display device of the present example embodiment is next described. FIG. 2 is a block diagram showing the internal configuration of a projector that is an example of the display device of the first example embodiment. The unidirectional arrows in each of the drawings described below clearly indicate the flow of a particular signal (data) and do not exclude bidirectionality.

Projector 200 shown in FIG. 2 has: input terminal (HDMI IN) 11, output terminal (HDMI OUT) 12, video transmission/reception unit 20, video signal processing unit 30, drive unit 40, display unit 50, control unit (CPU: Central Processing Unit) 60, bus (I2CBUS) 61, and storage unit 70. Video transmission/reception unit 20 has reception unit (HDMI receiver) 21, transmission unit (HDMI transmitter) 22, and HDCP setting unit 23.

HDMI IN 11 is a terminal for the input of a digital signal that takes as an example a video signal from a source apparatus or sink apparatus (repeater apparatus). HDMI OUT 12 is a terminal for the output of a digital signal that takes as an example a video signal to a sink apparatus (repeater apparatus). HDMI receiver 21 performs predetermined signal processing upon the video signal received as input from HDMI IN 11. HDMI transmitter 22 supplies to HDMI OUT 12 terminal the video signal that has undergone the predetermined signal processing in HDMI receiver 21. HDCP setting unit 23, as will be described, performs settings of the HDCP version according to the number of sink apparatuses (repeater apparatuses) that are daisy-chain connected. This HDCP setting unit 23 is an example of the setting means.

Video signal processing unit 30 performs predetermined signal processing upon the video signal that is received at video transmission/reception unit 20. Drive unit 40 drives display unit 50. Display unit 50 has projection lens 51. Projection lens 51 projects an image upon screen 500. Control unit (CPU) 60 controls the overall operation of projector 200. Storage unit 70 stores, for example, a computer program for allowing control unit (CPU) 60 to control the operation of projector 200. At least HDMI IN 11, HDMI receiver 21, HDMI transmitter 22, HDMI OUT 12, and display unit 50 are an example of the display means.

Each block that makes up projector 200 is connected using control unit (CPU) 60 and bus 61. Control unit (CPU) 60 controls the operation of each block in accordance with a computer program that is stored in storage unit 70. This control unit (CPU) 60 is an example of the determination means. Storage unit 70 further stores the following items. First, the KSV of its own apparatus. Second, the KSVs of, of the all of the other projectors (sink apparatuses) that are daisy-chain connected, all of the projectors provided downstream (downstream-side sink apparatuses) that are transmitted to the source apparatus by way of its own apparatus in the process of receiving authentication of the source apparatus. Third, a plurality of versions of the HDCP standard that are set using HDCP setting unit 23.

In the present example embodiment, an HDMI signal is assumed to be treated as a video signal. Accordingly, input terminal (HDMI IN) 11, output terminal (HDMI OUT) 12, reception unit (HDMI receiver) 21, and transmission unit (HDMI transmitter) 22 are all compatible with an HDMI signal. However, the device can also be configured to deal with a digital video signal such as DVI. Input terminal (HDMI IN) 11 is connected with a higher-ranked device by way of a video signal transmission cable (not shown in the figure). Input terminal (HDMI IN) 11 then receives a video signal and control signal from the higher-ranked device by way of video signal transmission cable.

The video signal that is received from input terminal (HDMI IN) 11 is transmitted to reception unit (HDMI receiver) 21 of video transmission/reception unit 20. Reception unit (HDMI receiver) 21 performs processing upon the video signal that is received from input terminal (HDMI IN) 11 such as serial/parallel conversion, signal level conversion, and decoding of the timing signal contained in a control signal. Various types of timing signals exist. When a projector is connected on the downstream side, transmission unit (HDMI transmitter) 22 supplies the video signal that was received to the projector on the downstream side by way of output terminal (HDMI OUT) 12.

The video signal that was subjected to processing such as the above-described conversion in reception unit (HDMI receiver) 21 is transmitted to video signal processing unit 30. Video signal processing unit 30 performs signal processing such as resolution conversion, gamma correction, and keystone correction upon the video signal that was transmitted from video transmission/reception unit 20. Video signal processing unit 30 transmits the video signal that has undergone these types of conversion and signal processing to drive unit 40. Drive unit 40 drives, for example, a display element or light source (not shown in the figure) that makes up display unit 50 in accordance with the video signal that was transmitted from video signal processing unit 30. The display element and light source produce image light. The display element and light source project image light from projection lens 51 of display unit 50. Display unit 50 forms and projects an image that corresponds to the received video signal upon screen 500.

The control of each block that makes up the above-described projector 200 is carried out by control unit (CPU) 60. Control unit (CPU) 60 is connected with each block by way of bus 61. Control unit (CPU) 60 is able to communicate with the control units (CPUs) of other projectors by way of HDMI cables and bus 61.

Figure 3:
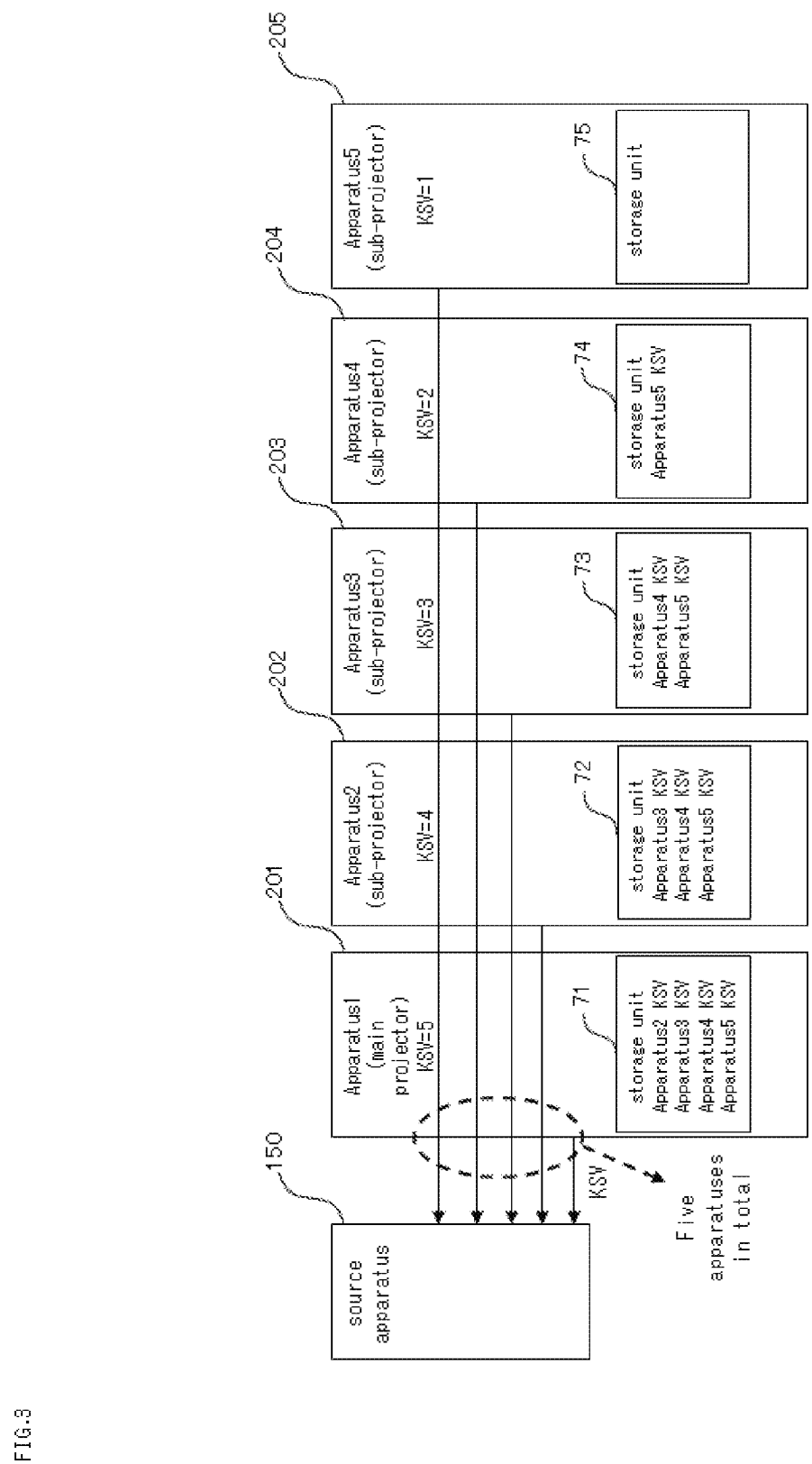
FIG. 3 shows an example of the KSV transmission state in the display device of the first example embodiment.

The transmission states of the KSV in the display device of the present example embodiment is next described. FIG. 3 shows an example of the KSV transmission states in the display device of the first example embodiment.

In FIG. 3, output terminal (HDMI OUT) 12 of apparatus 1 201 and input terminal (HDMI IN) 11 of apparatus 2 202 are connected. In addition, output terminal (HDMI OUT) 12 of apparatus 2 202 and input terminal (HDMI IN) 11 of apparatus 3 203 are connected. Further, output terminal (HDMI OUT) 12 of apparatus 3 203 and input terminal (HDMI IN) 11 of apparatus 4 204 are connected. Finally, output terminal (HDMI OUT) 12 of apparatus 4 204 and input terminal (HDMI IN) 11 of apparatus 5 205 are connected. Input terminal (HDMI IN) 11 of apparatus 1 is then connected to source apparatus 150.

In the process of receiving the authentication of source apparatus 150, each of apparatuses from apparatus 1 201 to apparatus 5 205 transmits the KSV of apparatus 1 201 to source apparatus 150. In addition, the KSV of apparatus 2 202 is transmitted to source apparatus 150 by way of apparatus 1 201. At this time, the KSV of apparatus 2 202 is stored in storage unit 71 of apparatus 1 201 when passing by way of apparatus 1 201.

In addition, the KSV of apparatus 3 203 is transmitted to source apparatus 150 by way of apparatus 2 202 and apparatus 1 201. At this time, the KSV of apparatus 3 203 is stored in storage unit 72 of apparatus 2 at the time of passage through apparatus 2 202. In addition, the KSV of apparatus 3 203 and the KSV of apparatus 2 202 are stored in storage unit 71 of apparatus 1 201 at the time of passage of apparatus 1 201.

The KSV of apparatus 4 204 is further transmitted to source apparatus 150 by way of apparatus 3 203, apparatus 2 202 and apparatus 1 201. At this time, the KSV of apparatus 4 is stored in storage unit 73 of apparatus 3 203 at the time of passage by way of apparatus 3 203. In addition, the KSV of apparatus 4 204 and apparatus 3 203 are stored in storage unit 72 of apparatus 2 202 at the time of passage by way of apparatus 2 202. Still further, the KSV of apparatus 4, apparatus 3 203, and apparatus 2 202 are stored in storage unit 71 of apparatus 1 201 at the time of passage by way of apparatus 1 201.

The KSV of apparatus 5 205 is then transmitted to source apparatus 150 by way of apparatus 4 204, apparatus 3 203, apparatus 2 202, and apparatus 1 201. At this time, the KSV of apparatus 5 205 is stored in storage unit 74 of apparatus 4 at the time of passage by way of apparatus 4 204. In addition, the KSV of apparatus 5 205 and apparatus 4 204 are stored in storage unit 73 of apparatus 3 203 at the time of passage by way of apparatus 3 203. Still further, the KSV of apparatus 5 205, apparatus 4 204, and apparatus 3 203 are stored in storage unit 72 of apparatus 2 202 at the time of passage by way of apparatus 2. In addition, the KSV of apparatus 5 205, apparatus 4 204, apparatus 3 203, and apparatus 2 202 are stored in storage unit 71 of apparatus 1 201 at the time of passage by way of apparatus 1.

In this way, regarding the number of KSV that are transmitted from a projector (sink apparatus) to source apparatus 150, the number of KSV that are transmitted to upstream-side projectors (sink apparatuses) increases with increase in the number of projectors (sink apparatuses) that are passed through. In addition, regarding the number of KSV that are transmitted from a projector (sink apparatus) to source apparatus 150, the number of KSV that are stored in the storage units of projectors that are on the upstream side increases with increase in the number of projectors (sink apparatuses) that are passed through. Apparatus 1 201 transmits to source apparatus 150 five KSV, i.e., the four KSV that were transmitted from the projectors (sink apparatuses) from apparatus 2 202 to apparatus 5 205 together with the one KSV of its own apparatus. Accordingly, apparatus 1 201 is able to recognize that a total of five projectors including its own apparatus are daisy-chain connected.

In addition, the KSV that are stored by projectors (sink apparatuses) are deleted when the connection with a connected partner apparatus (source apparatus or sink apparatus (projector)) is cut. The cutting of a connection with a partner apparatus (source apparatus or sink apparatus (projector)) referred to here also includes a case in which the power supply of the partner apparatus is turned OFF.

When the connection with a partner apparatus is restored, the sink apparatus both stores the KSV that were transmitted from sink apparatuses that are located at lower ranks and carries out a process of transmitting the stored KSV and the KSV of its own apparatus to sink apparatuses located at a higher rank. For example, a case will be considered in which, when apparatus 2 202 that is currently daisy-chain connected breaks down, apparatus 2 202 that has broken down is exchanged and a new apparatus 2 202 is connected. In this case, the new apparatus 2 202, similar to apparatus 2 that broke down before exchange, both stores the KSV that were transmitted from sink apparatuses that are located at lower ranks and transmits the KSV that were stored and the KSV of its own apparatus to apparatus 1 201.

Still further, control unit (CPU) 60 of each projector (sink apparatus) reports the number of KSV that were transmitted to source apparatus 150, i.e., the number of KSV that are stored in storage unit 70, to the control units (CPU) 60 of all other projectors (sink apparatuses) that are daisy-chain connected by way of a communication unit (not shown). The maximum number of KSV matches the total number of connected projectors that are daisy-chain connected. Accordingly, each projector (sink apparatus) is able to recognize the total number of connected apparatuses of projectors (sink apparatuses) that are daisy-chain connected.

Storage unit 70 of each projector (sink apparatus) stores the KSV of its own apparatus and the KSV of all projectors (downstream-side sink apparatuses) on the downstream side that were transmitted to the source apparatus by way of its own apparatus. Here, control unit (CPU) 60 of each projector compares the number of KSV that are stored in its own storage unit 70 (here referred to as the number of KSV of its own apparatus) and the recognized number of all connected projectors (sink apparatuses). The result of this comparison determines the order of connection of its own apparatus among the projectors (sink apparatuses) that are daisy-chain connected.

When, for example, the number of KSV of its own apparatus matches the total number of connected apparatuses, control unit (CPU) 60 of the projector (sink apparatus) determines that its own apparatus is arranged on the most upstream side among all projectors (sink apparatuses) that are daisy-chain connected. Alternatively, when the number of KSV of its own apparatus differs from the total number of connected apparatuses, control unit (CPU) 60 of the projector (sink apparatus) determines that it is not arranged on the most upstream side among all projectors (sink apparatuses) that are daisy-chain connected.

To explain in greater detail, when the number of KSV of its own apparatus is the same as the total number of connected apparatuses, control unit (CPU) 60 of a projector (sink apparatus) determines that it is the first (the order of connection is referred to as "first" hereinbelow) connected to source apparatus 150. When the number of KSV of its own device is just "1" smaller than the total number of connected apparatuses, control unit (CPU) 60 of the projector (sink apparatus) determines that it is connected second (order of connection=second) to source apparatus 150. When the number of KSV of its own apparatus is "2" smaller than the number of connected apparatuses, control unit (CPU) 60 of the projector (sink apparatus) determines that it is the third (order of connection=third) connected to source apparatus 150.

Thus, when the number of KSV of its own apparatus is compared with the total number of connected apparatuses=$K_{max}$ ($K_{max}$ is here assumed to be a natural number) and determined to be exactly L (L is here assumed to be a natural number) smaller, control unit (CPU) 60 of the projector (sink apparatus) determines that it is connected $(K_{max}-L+1)^{th}$ (the order of connection=$(K_{max}-L+1)^{th}$) to source apparatus 150. The determination is made similarly up to the $K_{max}^{th}$ that corresponds to the maximum value $K_{max}$ of KSV.

When the total number of connected apparatuses is determined in advance, control unit (CPU) 60 of the projector (sink apparatus) does not need to receive the number of KSV from another projector (sink apparatus). In this case, the order of connection of its own apparatus may be determined on the basis of the predetermined total number of connected apparatuses and the number of KSV of its own apparatus.

Control unit (CPU) 60 of each projector (sink apparatus) may use, for example, a wired LAN to report to control units (CPU) 60 of other projectors the number of KSV that were transmitted to source apparatus 150. Control unit (CPU) 60 of each projector (sink apparatus) compares the number of KSV of each projector (sink apparatus) that were reported with the number of KSV of its own apparatus. In this way, control unit (CPU) 60 of each projector (sink apparatus) determines the total number of connected projectors (sink apparatuses) that are daisy-chain connected. In addition, control unit (CPU) 60 of each projector (sink apparatus) determines whether its own apparatus is connected on the upstream side or the downstream side. For example, when its own apparatus is arranged on the most upstream side of all projectors (sink apparatuses) that are daisy-chain connected, control unit (CPU) 60 of the projector (sink apparatus) determines that its own apparatus is the main projector (sink apparatus). In addition, when its own apparatus is not arranged at the most upstream side of all projectors that are daisy-chain connected, control unit (CPU) 60 of a projector determines that its own apparatus is a sub-projector (sink apparatus). In the case of FIG. 3, apparatus 1 201 corresponds to the main projector, and apparatus 2 202 to apparatus 5 205 correspond to sub-projectors.

Figure 4:
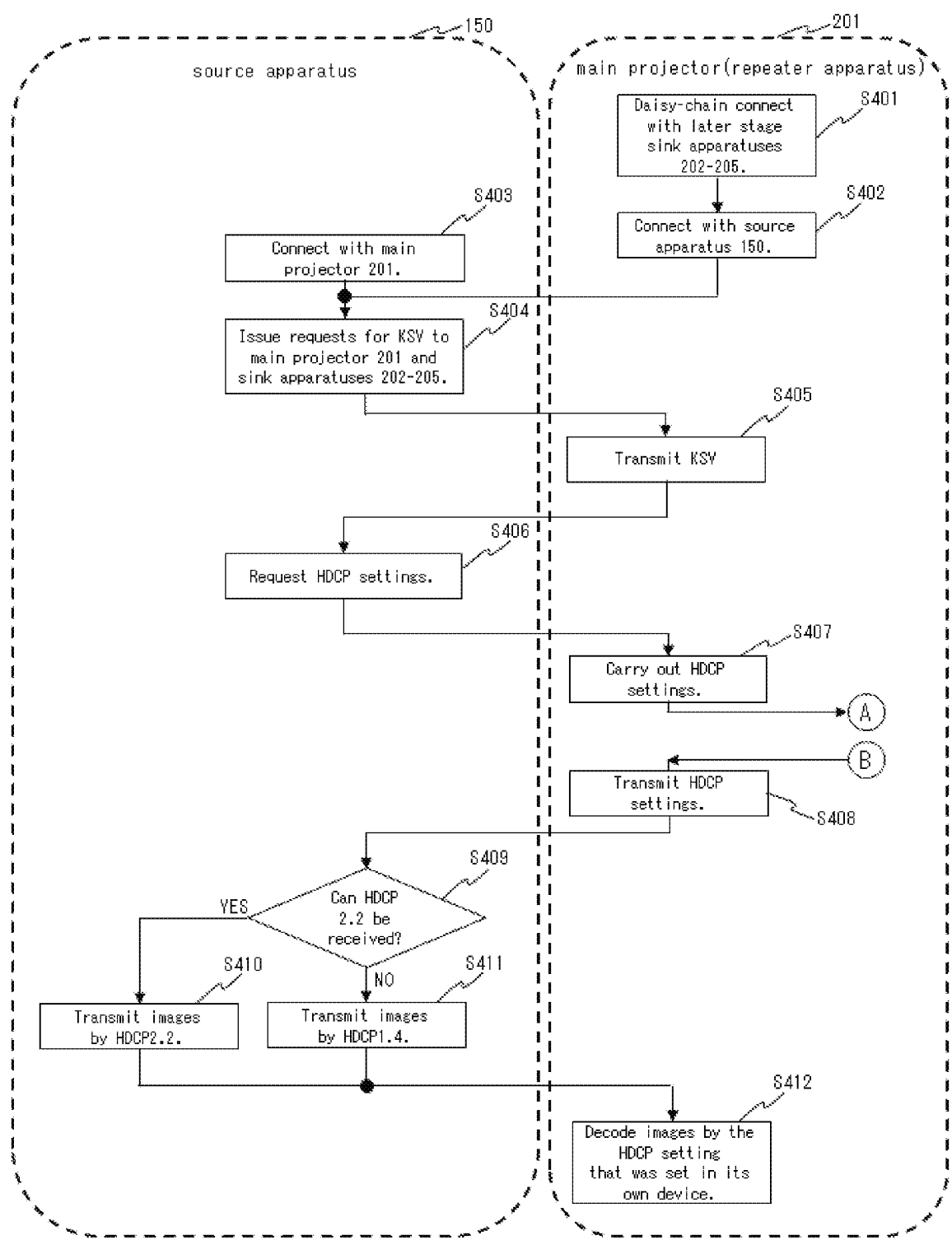
FIG. 4 is a flow chart showing the operation between a main projector (repeater apparatus) and a source apparatus when a projector (sink apparatus) that is an example of the display device of the first example embodiment is daisy-chain connected to the source apparatus.

Explanation next regards the operation between the source apparatus and the main projector (repeater apparatus) when projectors (sink apparatus) are daisy-chain connected to the source apparatus. FIG. 4 is a flow chart showing the operations between the source apparatus and the main projector (repeater apparatus) when a projector (sink apparatus) that is an example of the display device of the present example embodiment is daisy-chain connected to the source apparatus.

FIG. 4 describes only the relation between source apparatus 150 and main projector (repeater apparatus) 201 that is connected to source apparatus 150. However, in actuality, main projector 201 is connected to source apparatus 150 as described in FIG. 3. In addition, four sub-projectors 202-205 are also daisy-chain connected to main projector 201.

Main projector (repeater apparatus) 201 is first daisy-chain connected with sub-projectors (sink apparatuses) 202-205 of the stages that follow the main projector on the main projector 201 side in the process of Step S401.

In the process of Step S402, main projector 201 is connected with source apparatus 150.

On the source apparatus 150 side, source apparatus 150 is next connected in the process of Step S403 to main projector 201 that is daisy-chain connected to sink apparatuses 202-205.

In the process of Step S404, source apparatus 150 issues requests to main projector 201 and sub-projectors 202-205 to transmit KSV to source apparatus 150 in order to perform HDCP authentication of main projector 201 and sub-projectors 202-205.

Next, in the process of Step S405, main projector 201 transmits to source apparatus 150 the KSV of main projector 201 and the KSV of sub-projectors 202-205 that are daisy-chain connected.

In the process of Step S406, source apparatus 150 next requests main projector 201 to set the HDCP on the basis of the number of KSV that were transmitted in the process of Step S405. More specifically, source apparatus 150 requests that the version of the HDCP be set.

On the main projector 201 side, the HDCP version is set using HDCP setting unit 23 in the process of Step S407 on the basis of the number of KSV that were transmitted in the process of Step S405. This point will be described later.

Then, in the process of Step S408, main projector 201 transmits the HDCP version setting that was set in HDCP setting unit 23 to source apparatus 150.

On the source apparatus 150 side, it is determined in the process of Step S409 whether main projector 201 can receive HDCP version 2.2 on the basis of the HDCP version that was transmitted in the process of Step S408.

If source apparatus 150 determines that main projector 201 is able to receive HDCP 2.2 ("YES" in Step S409), source apparatus 150 transitions to the process of Step S410. If source apparatus 150 determines that main projector 201 is unable to receive HDCP 2.2 ("NO" in Step S409), source apparatus 150 transitions to the process of Step S411.

In the process of Step S410, source apparatus 150 uses HDCP 2.2 to transmit images to main projector 201.

In the process of Step S411, source apparatus 150 uses HDCP 1.4 to transmit images to main projector 201.

Essentially, source apparatus 150 encodes the video signal and transmits images to main projector 201 in accordance with the HDCP version setting that was received from main projector 201.

On the main projector 201 side, the images that were transmitted from source apparatus 150 are decoded on the basis of the HDCP version that was set in its own apparatus (to be described) in the process of Step S412.

Here, in main projector 201, a circuit that decodes a video signal that was encoded by HDCP 2.2 and a circuit that decodes a video signal that was encoded by HDCP 1.4 are mounted inside HDMI receiver 21 that was described in FIG. 2. Accordingly, control unit (CPU) 60 of main projector 201 selects which circuit in accordance with the HDCP version that was set in its own apparatus (to be described).

Main projector 201 further performs HDCP version settings that are the same as those of main projector 201 to sub-projectors 202-205 by way of a communication cable such as an HDMI cable.

Figure 5:
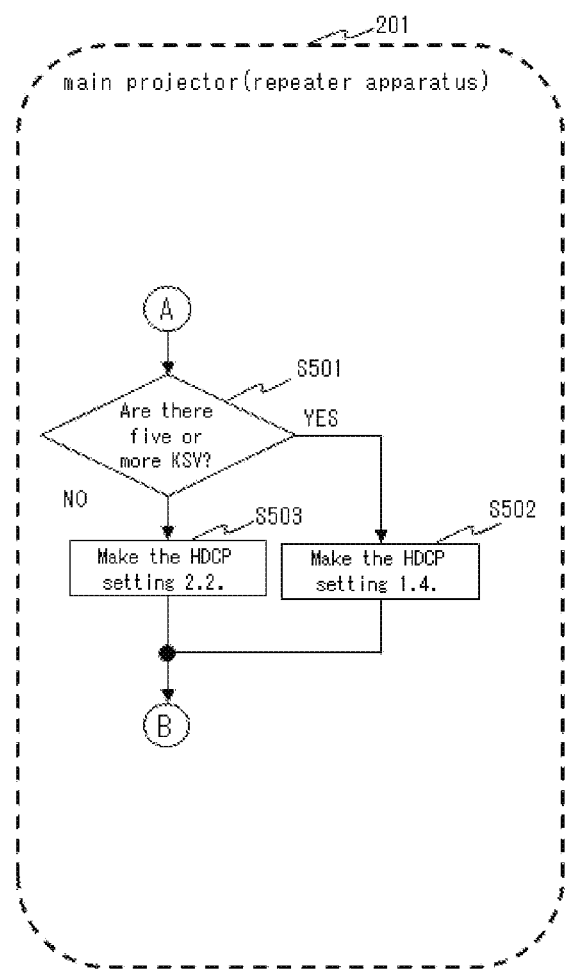
FIG. 5 is a flow chart showing the operation of main projector (repeater apparatus) when a projector (sink apparatus) that is an example of the display device of the first example embodiment is daisy-chain connected to a source apparatus.

The operation of the main projector (repeater apparatus) when projectors (sink apparatuses) that are an example of the display device of the present example embodiment are daisy-chain connected to the source apparatus is next described. FIG. 5 is a flow chart showing the operation of the main projector (repeater apparatus) when projectors (sink apparatuses) that are an example of the display device of the present example embodiment are daisy-chain connected to the source apparatus.

In FIG. 5, main projector 201 determines the HDCP version that is set in the process of Step S407 of FIG. 4 on the basis of the number of KDV that were transmitted to source apparatus 150 in the process of Step S405. In the process of Step S501, main projector 201 judges whether the number of KSV that were transmitted in the process of Step S405 is "5" or more.

If main projector 201 determines that the number of KSV is "5" or more ("YES" in Step S501), main projector 201 transitions to the process of Step S502. If the number of KSV is determined to not be "5" or more ("NO" in Step S501), main projector 201 transitions to the process of Step S503.

In the process of Step S502, main projector 201 uses HDCP setting unit 23 to make the HDCP version setting of its own apparatus 1.4. In Step S503, main projector 201 uses HDCP setting unit 23 to make the HDCP version setting of its own apparatus 2.2.

The process then transitions to Step S408 of FIG. 4, and main projector 201 transmits the HDCP version setting that was set in either Step S502 or Step S503 to source apparatus 150.

In the above-described example embodiment, explanation was presented taking as an example a projector as the display device. However, the display device of the present invention is not limited to a projector. In other words, the present invention can be widely applied to any type of display device as long as the device performs any type of display.

In addition, in the case of the currently standardized HDCP 1.4, the number of levels of repeater apparatuses that can be connected is limited to eight levels and the number of sink apparatus devices is limited to a maximum of 128. In the case of HDCP 2.2, the number of levels of repeater apparatuses that can be connected is limited to a maximum of four levels, and the number of sink apparatus devices is limited to a maximum of 32.

However, the HDCP standard has the potential for future version updates, and HDCP standards that are updated in the future may alter the maximum number of levels and the maximum number of devices. Accordingly, the present invention is a concept that includes the technical idea that the optimum HDCP version that can conform with the number of apparatuses that are connected is set automatically on the basis of the number of display devices that are daisy-chain connected.

In addition, the number of sink apparatuses that are daisy-chain connected to a source apparatus and the HDCP version that is set on the basis of the number of apparatuses may be set in advance. Still further, the most recent HDCP version that can conform on the basis of the number of sink apparatuses that are daisy-chain connected to a source apparatus may also be taken as the optimum HDCP version.

For example, in the case of HDCP version X that can be planned in the future, the number of levels of repeater apparatuses that can be daisy-chain connected to a source apparatus is assumed to be limited to a maximum of two levels and the number of sink apparatuses is limited to a maximum of 16. The display devices (sink apparatuses) are assumed to conform to all of HDCP versions 1.4, 2.2, and X. Still further, the HDCP version is assumed to be updated in the order of 1.4, 2.2, and X.

At this time, an example of application as described below is considered. In other words, the HDCP version is set to X when the number of display devices (sink apparatuses) that are daisy-chain connected to a source apparatus is "2." Alternatively, when the number of display devices (sink apparatuses) that are daisy-chain connected to a source apparatus is "3," the HDCP version is set to 2.2. Finally, when the number of display devices (sink apparatuses) that are daisy-chain connected to a source apparatus is "6," the HDCP version is set to 1.4. The most recent version may thus be included among the HDCP versions that can conform on the basis of the number of sink apparatuses that are daisy-chain connected to a source apparatus.

As described hereinabove, in the present example embodiment, the setting of the HDCP version is performed on the basis of the number of KSV that are stored in the sink apparatus that is connected at the nearest end to the source apparatus, i.e., the number of sink apparatuses that are daisy-chain connected. In this way, the time and trouble required for changing the setting of the HDCP version that is associated with the number of sink apparatuses that are daisy-chain connected can be eliminated even when a plurality of sink apparatuses are daisy-chain connected to a source apparatus.

Second Example Embodiment

Figure 6:
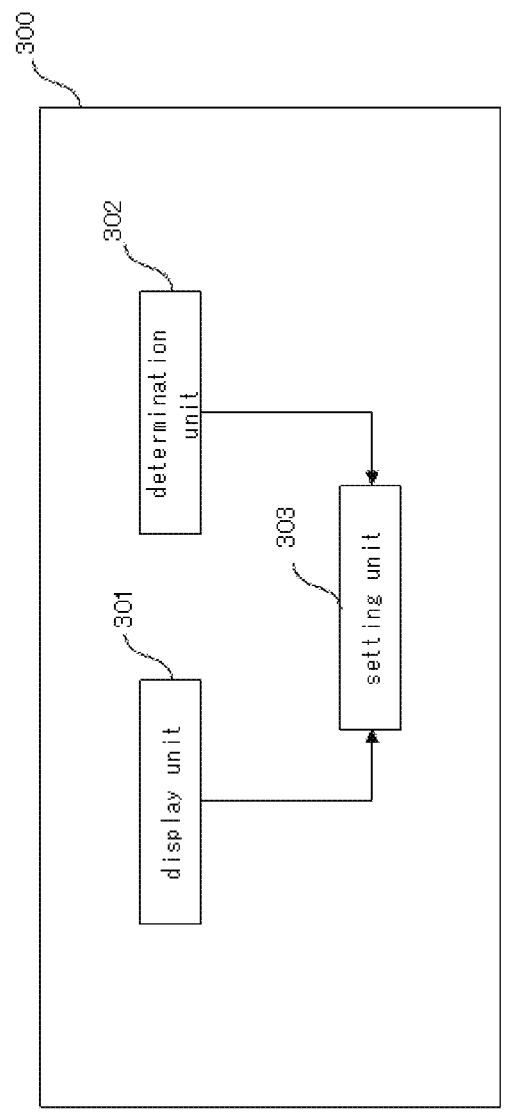
FIG. 6 is a schematic block diagram showing an example of the display device of the second example embodiment of the present invention.

The second example embodiment of the present invention is next described. FIG. 6 is a schematic block diagram showing an example of the display device of the second example embodiment of the present invention.

Referring to FIG. 6, display device 300 of the present example embodiment has display unit 301, determination unit 302, and setting unit 303.

Display unit 301 is daisy-chain connected to a source apparatus that supplies a video signal that was encoded by a predetermined version of a standard that is stipulated as a predetermined standard and displays an image that is generated by decoding the video signal that was encoded by the predetermined version. At least HDMI IN 11, HDMI receiver 21, HDMI transmitter 22, HDMI OUT 12, and display unit 50 in the first example embodiment are one example of display unit 301.

Determination unit 302 determines the number of connected sink apparatuses that are daisy-chain connected to the source apparatus. Control unit (CPU) 60 in the first example embodiment is one example of determination unit 302.

Setting unit 303 sets the version according to the number of connected sink apparatuses among the predetermined versions that is able to display images that are generated by decoding an image signal that has been encoded by the source apparatus on display unit 301 of all sink apparatuses that are daisy-chain connected. HDCP setting unit 23 in the first example embodiment is one example of setting unit 303.

A standard that is stipulated as a standard that protects copyright is taken as a specific example of the predetermined standard. HDCP is taken as a specific example of the predetermined standard.

Display device 300 of the present example embodiment is provided with display unit 301 that is daisy-chain connected to a source apparatus that supplies a video signal that is encoded by a predetermined version of a standard that is stipulated as a predetermined standard and displays images generated by decoding a video signal that was encoded by the predetermined version. Display device 300 is further provided with determination unit 302 that determines the number of connected sink apparatuses that are daisy-chain connected to the source apparatus. Display device 300 is further provided with setting unit 303 that, in accordance with the number of connected sink apparatuses, sets a version of the predetermined versions that is able to display on display unit 301 of all sink apparatuses that are daisy-chain connected images that are generated by decoding a video signal that was encoded at the source apparatus. In this way, display device 300 is able to eliminate the time and trouble of changing settings of the version of the copyright protection standard that is associated with the number of apparatuses that are daisy-chain connected even when a plurality of apparatuses are daisy-chain connected to a signal source.

The computer program that is stored in storage unit 70 of projector 200 may be provided by a recording medium or may be provided by way of a network such as the Internet. The recording medium is a medium that can be used by a computer or read by a computer and includes media that can allow the recording or reading of information by using magnetism, light, electronic, electromagnetism, or infrared light. Examples of this media include, for example, semiconductor memory, semiconductor or hard storage devices, magnetic tape, detachable computer diskettes, Random Access Memory (RAM), Read Only Memory (ROM), magnetic disks, optical disks, and magneto-optical disks.

Although the invention of the present application has been described above with reference to example embodiments, the invention of the present application is not limited to the above-described example embodiments. The configuration and details of the invention of the present application are open to various modifications within the scope of the invention of the present application that will be clear to one of ordinary skill in the art.

EXPLANATION OF REFERENCE NUMBERS

11 HDMI IN
12 HDMI OUT
20 video transmission/reception unit
21 HDMI receiver
22 HDMI transmitter
23 HDCP setting unit
30 video signal processing unit
40 drive unit
50 display unit
51 projection lens
60 control unit (CPU)
70, 71, 72, 73, 74, 75 storage unit
100 PC
101, 102, 103, 104, 105 HDMI cable
150 source apparatus
200, 201, 202, 203, 204, 205 projector
300 display device
301 display unit
302 determination unit
303 setting unit
500 screen

What is claimed is:

1. A display device including a memory that stores instructions, and a processor that executes those instructions stored in the memory to:
    display images that are generated by decoding a video signal that was encoded by a predetermined version that is daisy-chain connected to a source apparatus that supplies a video signal that was encoded by said predetermined version of a standard that is stipulated as a predetermined standard;
    determine an order and the number of connected sink apparatuses that are daisy-chain connected to said source apparatus; and
    set a version of said predetermined versions that is able to display, on a display apparatus of all said sink apparatuses that are daisy-chain connected, images that are generated by decoding a video signal that was encoded at said source apparatus according to said number of said connected sink apparatuses,
    wherein said processor determines the number of said connected sink apparatuses that are daisy-chain connected on the basis of a number obtained by adding together the number of public keys stored by the sink apparatus that is connected on the closest end to said source apparatus and the number of all public keys respectively possessed by each of all sink apparatuses that are daisy-chain connected to said sink apparatus that is connected on the closest end in a downstream direction from said source apparatus.

2. The display device as set forth in claim 1, wherein, in said predetermined standard, said video signal is encoded and transmitted to all said sink apparatuses that are daisy-chain connected, and all said sink apparatuses that are daisy-chain connected, upon receiving an authentication request from said source apparatus, transmit to said source apparatus a public key that is to be used in encoding.

3. The display device as set forth in claim 2, wherein said public keys comprise KSV (Key Selection Vectors).

4. The display device as set forth in claim 1, wherein each of said sink apparatuses that are daisy-chain connected has a respective different public key; and wherein when the source apparatus side in said daisy-chain connection is upstream and the side of the sink apparatus at the end is downstream, the sink apparatus that is connected on the most upstream side with respect to said source apparatus stores the public key of its own apparatus and all public keys possessed by each of all sink apparatuses that are daisy-chain connected to said sink apparatus that is connected on the most upstream side in a downstream direction from said source apparatus.

5. The display device as set forth in claim 1, wherein said predetermined standard comprises a standard stipulated as a standard that protects copyright.

6. The display device as set forth in claim 1, wherein said predetermined standard comprises HDCP (High-bandwidth Digital Content Protection).

7. The display device as set forth in claim 1, wherein said predetermined versions include at least version 1.4 and version 2.2 of the HDCP standard.

8. The display device as set forth in claim 1, wherein when a plurality of different display devices are daisy-chained to the source apparatus, the setting of said predetermined versions is automatically changed according to a number of daisy-chained display devices.

9. The display device as set forth in claim 1, wherein when a plurality of different display devices are daisy-chained to the source apparatus, the setting of HDCP versions is automatically changed according to a number of daisy-chained display devices.

10. The display device as set forth in claim 1, wherein the setting of the version is performed on a basis of a number of public keys that are stored in the sink apparatus that is connected at the nearest end to the source apparatus.

11. The display device as set forth in claim 1, wherein the predetermined versions include versions for digital content protection, and
    wherein the setting of the version is performed on a basis of a number of key selection vectors that are stored in the sink apparatus that is connected at the nearest end to the source apparatus.

12. A method of displaying a display device, the method being performed by a processor executing instructions stored in a memory, the method comprising:
    displaying images that are generated by decoding a video signal that was encoded by a predetermined version that is daisy-chain connected to a source apparatus that supplies a video signal that was encoded by said predetermined version of a standard that is stipulated as a predetermined standard;
    determining an order and the number of connected sink apparatuses that are daisy-chain connected to said source apparatus; and
    setting a version of said predetermined versions that is able to display on a display apparatus of all said sink apparatuses that are daisy-chain connected images that are generated by decoding a video signal that was encoded at said source apparatus according to said number of connected sink apparatuses,
    wherein the determining includes determining the number of said connected sink apparatuses that are daisy-chain connected on the basis of a number obtained by adding together the number of public keys stored by the sink apparatus that is connected on the closest end to said source apparatus and the number of all public keys respectively possessed by each of all sink apparatuses that are daisy-chain connected to said sink apparatus that is connected on the closest end in a downstream direction from said source apparatus.

13. The method as set forth in claim 12, wherein when a plurality of different display devices are daisy-chained to the source apparatus, the setting of said predetermined versions is automatically changed according to a number of daisy-chained display devices.

14. The method as set forth in claim 12, wherein when a plurality of different display devices are daisy-chained to the source apparatus, the setting of digital content protection versions is automatically changed according to a number of daisy-chained display devices.

15. The method as set forth in claim 12, wherein the setting of the version is performed on a basis of a number of key selection vectors that are stored in the sink apparatus that is connected at the nearest end to the source apparatus.

16. A non-transitory recording medium on which is stored a program that causes a computer to execute processes of:
    displaying images that are generated by decoding a video signal that was encoded by a predetermined version that is daisy-chain connected to a source apparatus that supplies a video signal that was encoded by said predetermined version of a standard that is stipulated as a predetermined standard;
    determining an order and the number of connected sink apparatuses that are daisy-chain connected to said source apparatus; and
    setting a version of said predetermined versions that is able to display on a display apparatus of all said sink apparatuses that are daisy-chain connected images that are generated by decoding a video signal that was encoded at said source apparatus according to said number of connected sink apparatuses,
    wherein the determining includes determining the number of said connected sink apparatuses that are daisy-chain connected on the basis of a number obtained by adding together the number of public keys stored by the sink apparatus that is connected on the closest end to said source apparatus and the number of all public keys respectively possessed by each of all sink apparatuses that are daisy-chain connected to said sink apparatus that is connected on the closest end in a downstream direction from said source apparatus.

17. The non-transitory recording medium as set forth in claim 16, wherein when a plurality of different display devices are daisy-chained to the source apparatus, the setting of said predetermined versions is automatically changed according to a number of daisy-chained display devices.

18. The non-transitory recording medium as set forth in claim 16, wherein when a plurality of different display devices are daisy-chained to the source apparatus, the setting of digital content protection versions is automatically changed according to a number of daisy-chained display devices.

19. The non-transitory recording medium as set forth in claim 16, wherein the setting of the version is performed on a basis of a number of key selection vectors that are stored in the sink apparatus that is connected at the nearest end to the source apparatus.

* * * * *